United States Patent
Vajipayajula et al.

(10) Patent No.: US 11,228,612 B2
(45) Date of Patent: Jan. 18, 2022

(54) IDENTIFYING CYBER ADVERSARY BEHAVIOR

(71) Applicant: International Business Machines Corporation, Armonk, NY (US)

(72) Inventors: Sulakshan Vajipayajula, Bengaluru (IN); Kaushal Kiran Kapadia, Alpharetta, GA (US); Stephen Cameron Will, Raleigh, NC (US); Ilgen Banu Yuceer, London (GB); Kevin Tabb, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/367,739

(22) Filed: Mar. 28, 2019

(65) Prior Publication Data
US 2020/0314141 A1 Oct. 1, 2020

(51) Int. Cl.
*H04L 29/06* (2006.01)

(52) U.S. Cl.
CPC ...... *H04L 63/1466* (2013.01); *H04L 63/0263* (2013.01); *H04L 63/145* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2014/0201836 A1* | 7/2014 | Amsler | H04L 63/20 726/23 |
| 2015/0163242 A1 | 6/2015 | Laidlaw et al. | |
| 2015/0365438 A1* | 12/2015 | Carver | H04L 63/1416 726/1 |
| 2016/0028754 A1* | 1/2016 | Cruz Mota | H04L 63/1416 726/23 |
| 2016/0028764 A1* | 1/2016 | Vasseur | H04L 63/1416 726/23 |

(Continued)

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Joseph P Hirl
*Assistant Examiner* — Hassan Saadoun
(74) *Attorney, Agent, or Firm* — Yee & Associates, P.C.

(57) ABSTRACT

Identifying cyber adversary behavior on a computer network is provided. Individual security events are received from multiple threat intelligence data sources. A security incident corresponding to an attack on at least one element of the computer network, the security incident being described by the individual security events received from the multiple threat intelligence data sources, is matched to a defined cyber adversary objective in a structured framework of a plurality of defined cyber adversary objectives and a related technique associated with the defined cyber adversary objective used by a cyber adversary in the attack. A set of mitigation actions is performed on the computer network based on matching the security incident corresponding to the attack on the computer network to the defined cyber adversary objective and the related technique.

20 Claims, 8 Drawing Sheets

(56) References Cited

U.S. PATENT DOCUMENTS

| | | | |
|---|---|---|---|
| 2016/0036838 A1* | 2/2016 | Jain | H04L 63/1416 |
| | | | 726/23 |
| 2017/0116416 A1 | 4/2017 | Pearcy et al. | |
| 2017/0223037 A1 | 8/2017 | Singh et al. | |
| 2019/0312890 A1* | 10/2019 | Perilli | G06N 20/00 |

OTHER PUBLICATIONS

Endgame, "MITRE ATT&CK Coverage," accessed Mar. 25, 2019, copyright 2019, 9 pages. https://www.endgame.com/mitre-attck-coverage.
Nafziger, "Practical Attack Detection using Big Data, Semantic Methods, and Kill Chains," A Practical Big Data Kill Chain Framework, SANS Institute Information Security Reading Room, Oct. 1, 2014, copright 2019, 37 pages. https://www.sans.org/reading-room/whitepapers/warfare/practical-big-data-kill-chain-framework-35487.

\* cited by examiner

MALWARE CAMPAIGN TO CYBER ADVERSARY
OBJECTIVE MAPPING PROCESS
600

604 — EVENT 80250003 INFORMATIONAL EMAIL MESSAGE — INITIAL ACCESS

606 — EVENT 42002430 WEB ATTACK: SUSPICIOUS EXECUTABLE FILE DOWNLOAD — EXECUTION

608 — RULE 106053 UBA: SHELLBAGS MODIFIED BY RANSOMWARE — PERSISTENCE

PRIVILEGE ESCALATION

610 — RULE 13500072 TCP_HIT — DEFENSE EVASION

LATERAL MOVEMENT

612 — RULE 67500898 UBA: RISKY URL FILTER CATEGORY-MALICIOUS SOURCES

614 — RULE 67500171 SUSPICIOUS OUTBOUND WEB/PROXY TRAFFIC — COMMAND AND CONTROL

EXFILTRATION

602 CYBER ADVERSARY OBJECTIVES

FIG. 6

IDENTIFYING CYBER ADVERSARY BEHAVIOR

BACKGROUND

1. Field

The disclosure relates generally to network security and more specifically to identifying cyber adversary behavior on a computer network corresponding to a security incident reported to a security information and event manager based on mapping security rules and events, along with indicators corresponding to the security incident to a consistently structured framework capturing cyber adversary behavior. The mapping identifies a predefined objective of a cyber adversary and a known technique to achieve that objective.

2. Description of the Related Art

Network security consists of the policies and practices adopted to prevent and monitor unauthorized access, misuse, modification, or denial of a computer network and network-accessible resources. Network security involves the authorization of access to the computer network and its resources. Typically, users choose or are assigned an identifier, such as a user name, and a password or other authenticating information that allows the users access to the network and network resources within their authority. For example, once authenticated, a firewall enforces rules and policies that defined what resources the network users are allowed to access.

However, networks are subject to attacks by malicious users. Attacks may be passive or active. A passive attack is when a malicious user intercepts data traveling through the network. An active attack is when a malicious user initiates commands to disrupt the network's normal operation or to conduct reconnaissance and lateral movement to find and gain access to resources available via the network.

Current network security solutions either protect against known attacks or identify malicious behavior. These current network security solutions may range from traditional anti-virus and firewall solutions to intrusion prevention and network forensic solutions. However, today's attackers are clever and patient and their methods of attack are getting more sophisticated. As a result, existing network security solutions are not sufficient to protect against advanced persistent threats. An advanced persistent threat uses multiple phases to gain access to a network, avoid detection, and harvest information over an extended period of time.

SUMMARY

According to one illustrative embodiment, a computer-implemented method for identifying cyber adversary behavior on a computer network is provided. Individual security events are received from multiple threat intelligence data sources. A security incident corresponding to an attack on at least one element of the computer network, the security incident being described by the individual security events received from the multiple threat intelligence data sources, is matched to a defined cyber adversary objective in a structured framework of a plurality of defined cyber adversary objectives and a related technique associated with the defined cyber adversary objective used by a cyber adversary in the attack. A set of mitigation actions is performed on the computer network based on matching the security incident corresponding to the attack on the computer network to the defined cyber adversary objective and the related technique. According to other illustrative embodiments, a computer system and computer program product for identifying cyber adversary behavior on a computer network are provided.

BRIEF DESCRIPTION OF THE DRAWINGS

FIG. 6 is a diagram illustrating an example of a malware campaign to cyber adversary objective mapping process in accordance with an illustrative embodiment;

DETAILED DESCRIPTION

Figure 1:
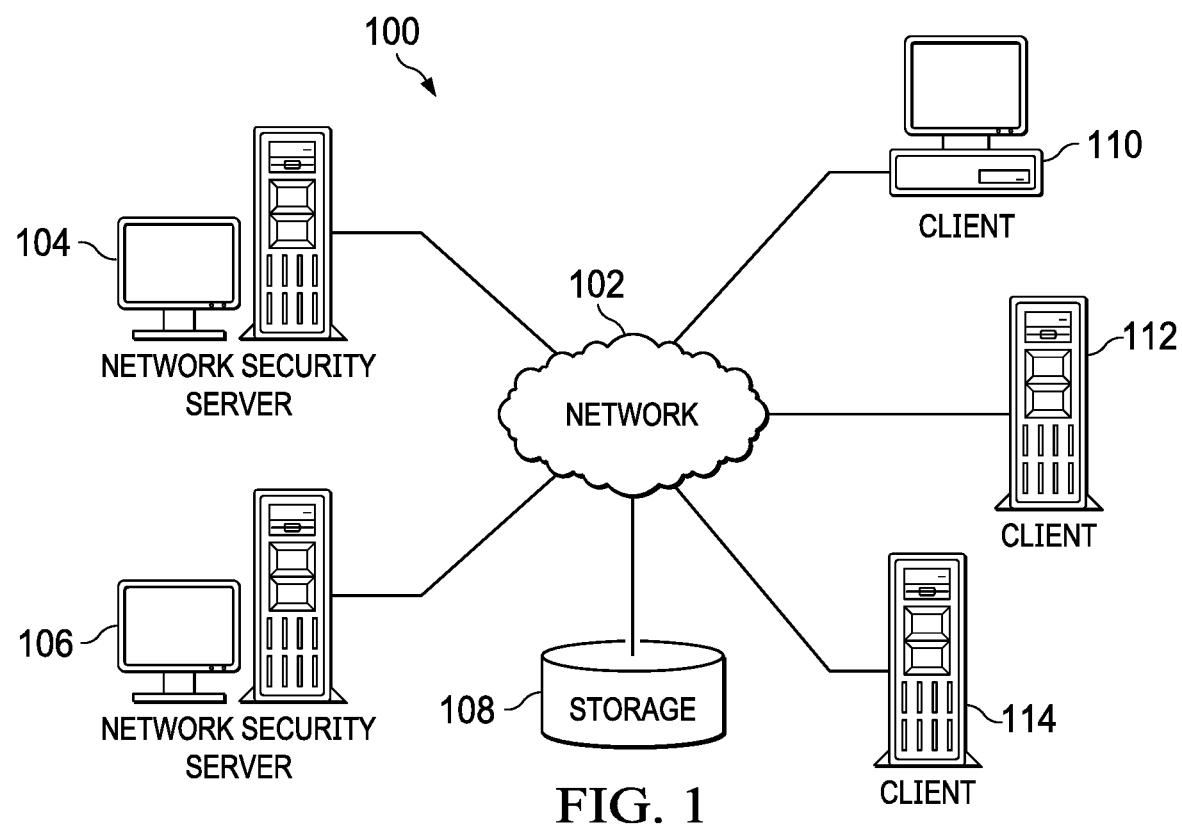
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables. Also, network 102 may be, for example, a private network, a public network, a hybrid network, a corporate network, or the like.

In the depicted example, network security server 104 and network security server 106 connect to network 102, along with storage 108. Network security server 104 and network security server 106 may be, for example, server computers with high-speed connections to network 102. In addition, network security server 104 and network security server 106 provide network security services for network 102 by monitoring user activity on network 102, identifying cyber adversary behavior based on security rules and indicators of compromise that correspond to known objectives and techniques of cyber adversaries, and automatically performing one or more action steps to mitigate identified cyber adversary behavior on network 102. Also, it should be noted that network security server 104 and network security server 106 may represent computing nodes in a cloud environment that manages network security services for one or more networks and their respective resources. Alternatively, network security server 104 and network security server 106 may represent clusters of servers in a data center. Further, network security server 104 and network security server 106 may provide information, such as, for example, programs, application, updates, patches, and the like, to the registered client data processing systems.

Client 110, client 112, and client 114 also connect to network 102. In this example, client 110 is shown as desktop or personal computer with wire communication links to network 102. However, it should be noted that client 110 is an example only and may represent other types of data processing systems, such as, for example, a laptop computer, handheld computer, smart phone, smart watch, smart television, or the like, with wire or wireless communication links to network 102. A user of client 110 may utilize client 110 to access and utilize the resources and/or services provided by client 112 and client 114. Resources may include, for example, data, documents, software such applications and programs, hardware such as processors, memory, and storage, and the like. Services may include any type of online service, such as, for example, banking services, financial services, governmental services, insurance services, entertainment services, search services, reservation services, and the like. In addition, it should be noted that client 110 may represent a plurality of different client devices corresponding to a plurality of different users.

However, it should be noted that the user of client 110 may be a cyber adversary, such as, for example, a malicious user, an unauthorized user, or the like, that is performing or is attempting to perform malicious activity, such as, for example, orchestrating a denial of service attack, orchestrating a malware campaign, exploiting vulnerabilities, performing reconnaissance, extracting or modifying sensitive data or documents, obtaining command and control, and the like, on client 112 and client 114. Clients 112 and 114 are registered clients of network security server 104 and network security server 106. In this example, client 112 and client 114 each represents a data processing system, such as a sever computer, that provides the resources and services of network 102. Further, it should be noted that client 112 and client 114 may each represent a plurality of data processing systems corresponding to one or more organizations, enterprises, institutions, agencies, and the like.

Storage 108 is a network storage device capable of storing any type of data in a structured format or an unstructured format. In addition, storage 108 may represent a plurality of network storage devices. Further, storage 108 may store identifiers and network addresses for a plurality of different network security servers, identifiers and network addresses for a plurality of different registered client devices, identifiers for a plurality of different users, and the like. Furthermore, storage unit 108 may store cyber adversary objectives and techniques data, vulnerabilities data, cyber adversary identities, IP and URL addresses corresponding to the cyber adversary identities, indicators of compromise data, malware data, security blogs, and the like. Moreover, storage unit 108 may store other types of data, such as authentication or credential data that may include user names, passwords, and biometric data associated with network users, system administrators, and security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on network security server 104 and downloaded to client 112 over network 102 for use on client 112.

In the depicted example, network data processing system 100 may be implemented as a number of different types of communication networks, such as, for example, an internet, an intranet, a local area network, a wide area network, a telecommunications network, or any combination thereof. FIG. 1 is intended as an example only, and not as an architectural limitation for the different illustrative embodiments.

Figure 2:
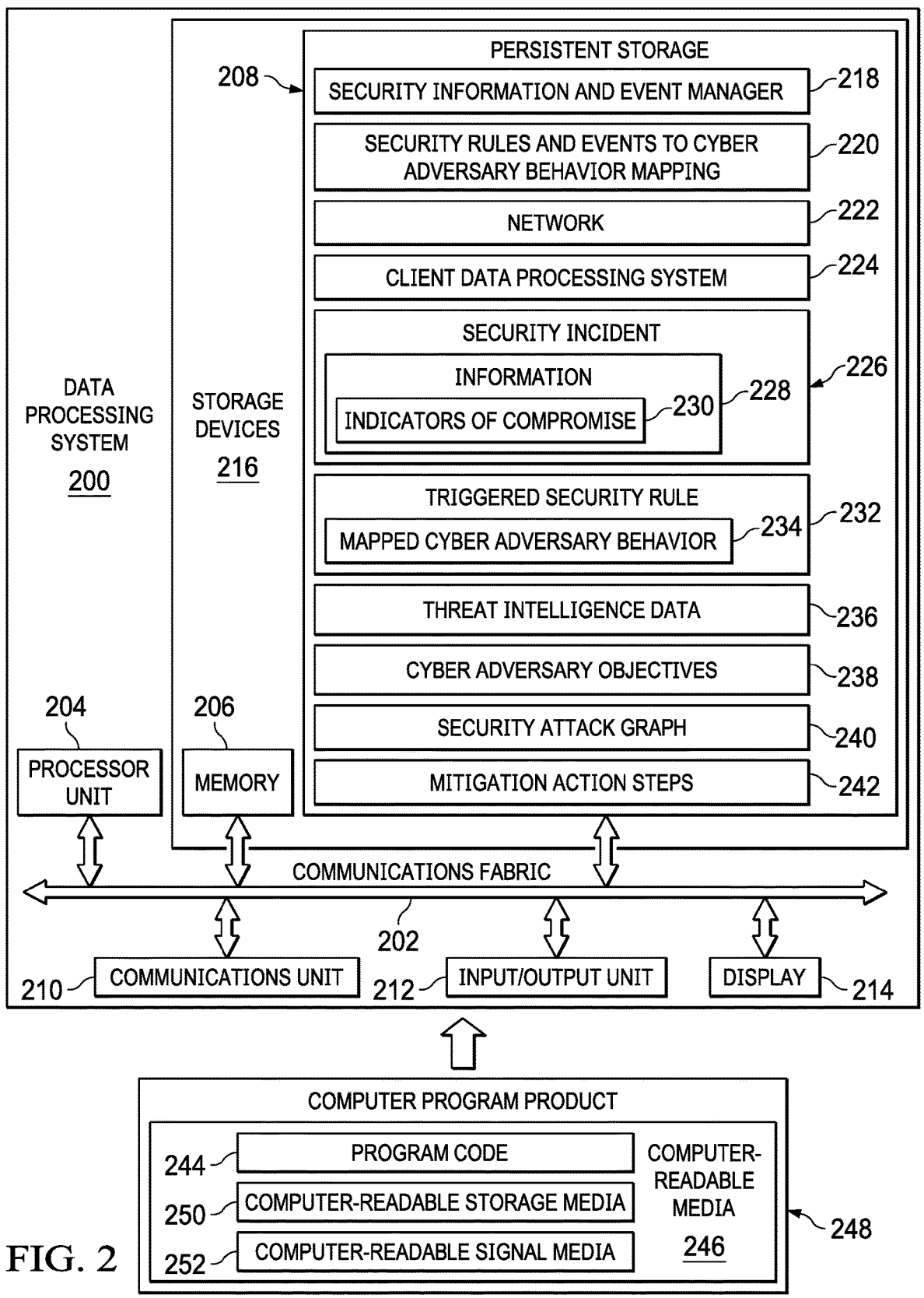
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as network security server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores security information and events manager 218. However, it should be noted that even though security information and events manager 218 is illustrated as residing in persistent storage 208, in an alternative illustrative embodiment security information and events manager 218 may be a separate component of data processing system 200. For example, security information and events manager 218 may be a hardware component coupled to communication fabric 202 or a combination of hardware and software components. In another alternative illustrative embodiment, a first set of components of security information and events manager 218 may be located in data processing system 200 and a second set of components of security information and events manager 218 may be located in a second data processing system, such as, for example, network security server 106.

Security information and events manager 218 controls the process of identifying cyber adversary behavior corresponding to a security incident on a computer network, such as network 102 in FIG. 1, based on mapping security rules and indicators of compromise to defined cyber adversary objectives and their related techniques. Security information and events manager 218 utilizes security rules and events to cyber adversary behavior mapping 220 to map each respective security rule and event to one or more cyber adversary behaviors, which include objectives and techniques. A security analyst or group of security analysts, for example, creates the security rules and provides the mappings between the different rules and the different cyber adversary behaviors.

Network 222 represents an identifier of the network that security information and events manager 218 is monitoring for security incidents, such as cyber adversary activity. However, it should be noted that network 222 may represent a set of one or more networks security information and events manager 218 is monitoring. Client data processing system 224 represents an identifier of a registered hardware device, such as, for example, client 112 in FIG. 1, which is connected to network 222 and has reported security incident 226 to security information and events manager 218 for analysis and possible mitigation action. It should be noted that security incident 226 is comprised of individual of security events.

Security incident 226 includes information 228, which contains characteristics, attributes, and features corresponding to security incident 226, such as indicators of compromise 230. Security information and events manager 218 extracts indicators of compromise 230 from information 228 using, for example, natural language processing. Indicators of compromise 230 may include, for example, time of security incident 226, identifier associated with the user corresponding to security incident 226, IP address of the data processing system corresponding to the user (e.g., IP address of client 110 in FIG. 1), IP address of the target device (i.e., client data processing system 224), and the like. Indicators of compromise 230 may also include other information, such as, for example, known virus signatures, hashes of malware files, domain names of command and control servers, and the like.

Triggered security rule 232 represents a set of one or more security rules of a plurality of security rules that was activated or prompted by security incident 226. Security information and events manager 218 utilizes security rules and events to cyber adversary behavior mapping 220 to map triggered security rule 232 to a set of one or more cyber adversary behaviors, which in this example is mapped cyber adversary behavior 234. In other words, mapped cyber adversary behavior 234 represents the set of cyber adversary behaviors, which includes objectives and techniques, corresponding to triggered security rule 232. Further, security information and events manager 218 assigns a confidence level, such as, for example, a high confidence level, a medium confidence level, or a low confidence level, that corresponds to the strength of the mapping between triggered security rule 232 and mapped cyber adversary behavior 234. Security information and events manager 218 also utilizes threat intelligence data 236, which security information and events manager 218 retrieves from a plurality of remote trusted third-party structured and unstructured threat intelligence data sources, to identify other possible cyber adversary behaviors corresponding to security incident 226.

Cyber adversary objectives 238 represent a plurality of predefined cyber adversary objectives and their corresponding techniques performed by a cyber adversary during an attack or intrusion. For example, cyber adversary objectives 238 may include initial access, execution, persistence, privilege escalation, defense evasion, lateral movement, command and control, exfiltration, and the like. Techniques used by the cyber adversary to achieve objectives may be, for example, a phishing link, credential dump, and the like.

An initial access objective represents techniques or vectors that a cyber adversary utilizes to achieve or obtain an initial foothold within the network. An execution objective represents techniques that result in execution of cyber adversary-controlled code on the target system. The cyber adversary often uses the execution objective in conjunction with initial access as the means of executing code once access is obtained and uses lateral movement to expand access to other target systems on the network. A persistence objective is any access, action, or configuration change technique used by the cyber adversary to obtain a persistent presence on the target system. The cyber adversary often gains access to the target system through interruptions, such as system restarts, loss of credentials, or other failures.

A privilege escalation objective allows the cyber adversary to obtain a higher level of permissions on the network or target system. The cyber adversary usually enters the target system with unprivileged access and then takes advantage of one or more vulnerabilities of the target system to obtain, for example, administrator or root level privileges. A defense evasion objective consists of techniques that the cyber adversary uses to evade detection or avoid defenses. Defense evasion may be considered a set of attributes that the cyber adversary applies to all other objectives of the attack.

A lateral movement objective consists of techniques that enable the cyber adversary to access and control other target systems on the network, besides the initially accessed target system. The lateral movement techniques may allow the cyber adversary to collect information from the other target systems without needing additional tools, such as a remote access tool. A command and control objective represents techniques that allow the cyber adversary to communicate with target systems under the cyber adversary's control within the network. Many techniques currently exist that allow the cyber adversary to establish command and control with various levels of covertness, depending on target system configuration and network topology. An exfiltration objective represents techniques that the cyber adversary utilizes to remove documents, files, data, and the like from the target system.

Security information and events manager 218 correlates mapped cyber adversary behavior 234, which includes objectives and techniques corresponding to security incident 226, to cyber adversary objectives 238. Moreover, security information and events manager 218 presents the details of the identified cyber adversary behavior corresponding to security incident 226, which includes the mapping confidence level and the predefined cyber adversary objective, within security attack graph 240 on display 214 for review by the security analyst in real-time or near real-time. In addition, security information and events manager 218 may automatically perform mitigation action steps 242 when security information and events manager 218 identifies cyber adversary behavior occurring on client data processing system 224. Mitigation action steps 242 represent a set of one or more steps that security information and events manager 218 performs to lessen or eliminate the effects of security incident 226 on client data processing system 224. Mitigation action steps 242 may include, for example, sending a security alert to security personnel, only allowing access to low-risk resources or services and preventing access to high-risk resources or services of client data processing system 224 and/or network 222 by the device that is the source of the identified cyber adversary behavior, blocking all network traffic from the source device to data processing system 224 and/or network 222, and the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
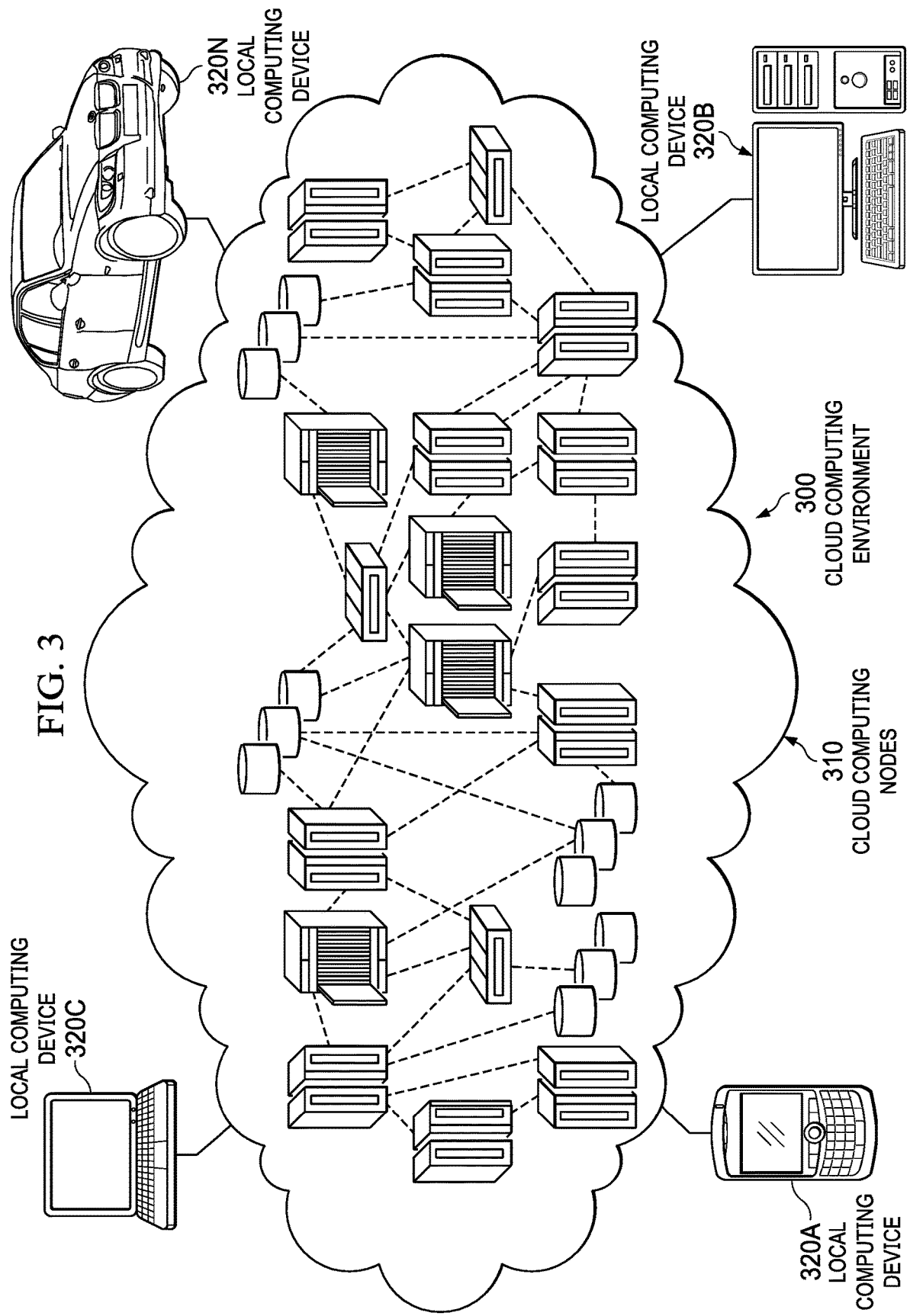
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, network security server 104, network security server 106, client 112, and client 114 in FIG. 1. A local computing device of local computing devices 320A-320N may be, for example, client 110 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
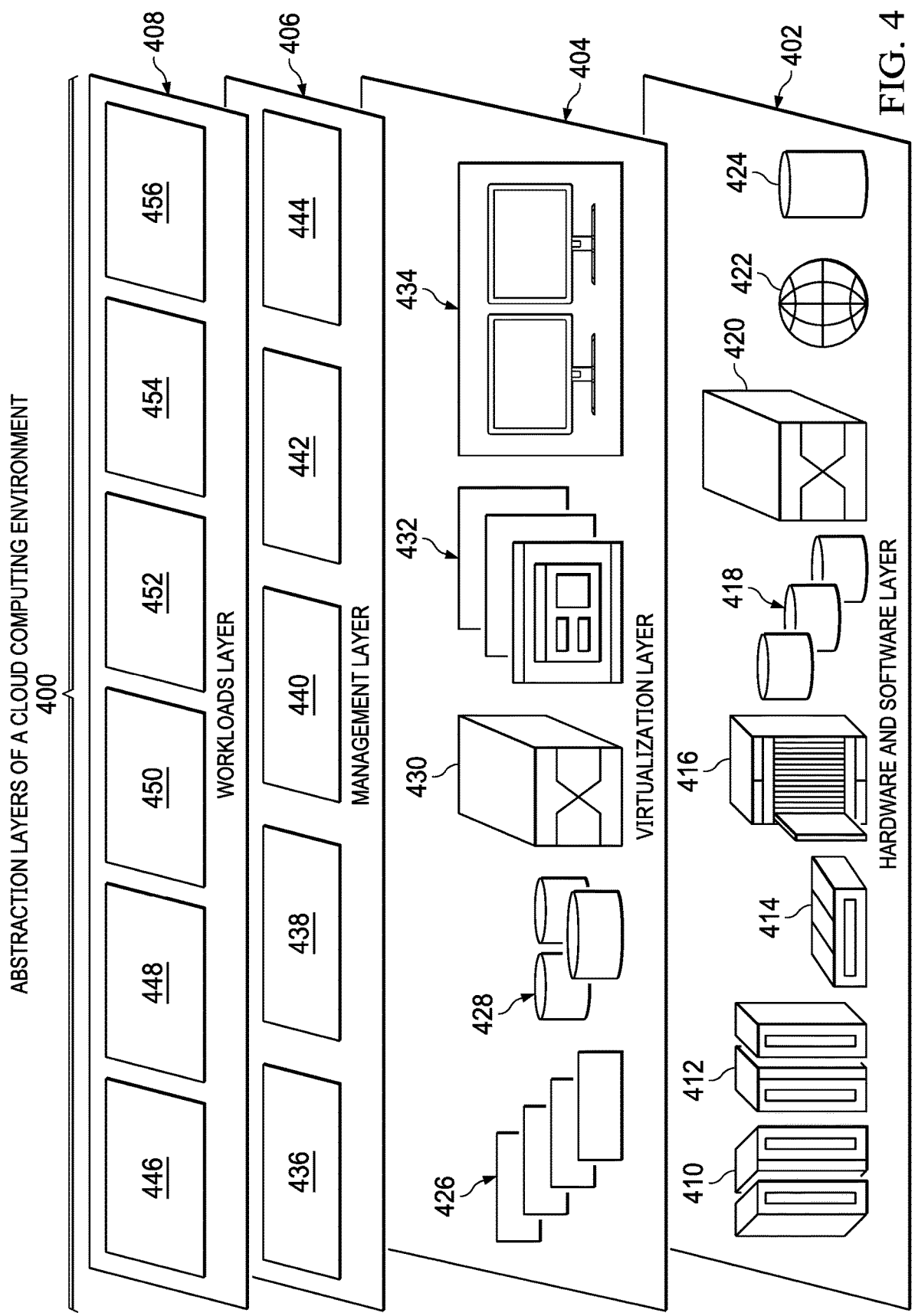
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and network security management 456.

Information technology security organizations constantly adjust their network security monitoring apparatus to counter various cyber adversary objectives and techniques. These information technology security organizations need tools to detect these cyber adversary objectives and techniques used during an attack, respond to threats posed by the attack, and perform risk analysis. Security analysts would like a context and chronological layout of security events with pertinent indicators of compromise from semantic methods such as time, user identifier, source system IP address, target system IP address, and the like. Indicators of compromise are any observed artefact on a network that indicates an attack with high confidence, such as, for example, virus signatures, hashes of malware files, domain names of command and control servers, and the like. This information helps security analysts understand cyber adversary methodologies.

A database of known cyber adversary behavior provides a way to identify cyber adversary objectives and their related techniques, reflecting the various phases of a cyber adversary's attack cycle. However, no tools currently exist that can automatically analyze a security incident, identity the cyber adversary's objectives and techniques corresponding to the security incident, and present this information in a security attack graph that a security analyst can quickly understand during real-time investigation of the security incident. A security attack graph is a representation of paths through a network that end in a state of attack on resources of the network.

Illustrative embodiments provide a method for identifying cyber adversary objectives and techniques corresponding to a security incident reported on a security information and event management system. A security information and event management system combines security information management and security event management. The security information and event management system provides real-time analysis of security incident alerts generated by network software and hardware. Illustrative embodiments provide a novel way to determine cyber adversary behavior, which includes objectives and techniques, related to the security incident by running analytics that leverage threat intelligence data from structured and unstructured threat intelligence data sources.

Illustrative embodiments factor in security events from multiple data sources and present a holistic graphical user interface view. Illustrative embodiments use a combination of security rule to cyber adversary objective mapping and observable-based threat intelligence data to predict a cyber adversary's objective corresponding to a security incident. In other words, illustrative embodiments utilize a content mapping of security information and events management system rules and events to possible cyber adversary objectives and their related techniques. A security rule is a set of one or more tests that triggers an action when specific conditions are met. Each security rule can be configured to capture and respond to a specific security event, sequence of security events, network flow sequence, or offense. A cyber adversary objective is how a malicious user coordinates and controls an attack on a network and its resources.

Subject matter experts classify the security information and events management system content for known cyber adversary objectives and techniques. Illustrative embodiments also allow authorized users to add new custom rules they have created and map those new custom rules to particular cyber adversary objectives and techniques. In addition, illustrative embodiments allow authorized users to modify any rule to cyber adversary objective mapping.

Illustrative embodiments also utilize observable threat intelligence data and indicators of compromise recorded by structured threat intelligence data sources. Illustrative embodiments identify cyber adversary objectives and techniques corresponding to a security incident based on the structured threat intelligence data corresponding to the indicators of compromise associated with the security incident and related indicators of compromise identified during cloud-based security analytics. Further, illustrative embodiments utilize user behavior analytics data to map security events to different cyber adversary objectives and techniques. Cyber adversary objectives may include, for example, initial access, execution, persistence, privilege escalation, defense evasion, lateral movement, command and control, exfiltration, and the like.

User behavior analytics is a network security process that detects, for example, insider threats, advanced persistent threats, targeted attacks, financial fraud, and the like. User behavior analytics look at patterns of user behavior and then apply algorithms and statistical analysis to detect anomalies, which indicate potential threats, from those user behavior patterns. Instead of tracking devices or security events, user behavior analytics track users of a network. User behavior analytics functionality may analyze, for example, petabytes of data to detect network threats.

Moreover, illustrative embodiments extract cyber adversary tactics, techniques, and procedures data, known software and hardware vulnerability information, and other security information using an artificial intelligence natural language processing component that processes natural language data of known malware campaigns stored in unstructured threat intelligence data sources, such as security blogs, computer emergency readiness team information, and the like. Tactics, techniques, and procedures data define how a cyber adversary orchestrates and manages attacks. In other words, tactics, techniques, and procedures data are patterns of activities and methods associated with particular cyber adversaries or groups of cyber adversaries. Illustrative embodiments also assign a weight to each cyber adversary objective associated with a security rule and assign a mapping confidence level to each respective security rule to cyber adversary objective mapping. A confidence level may be, for example, a high, medium, or low confidence level. In addition, illustrative embodiments represent the cyber adversary objectives and techniques on a security attack graph that depicts the security incident as indicators of compromise and their corresponding relationships.

Cyber adversary objective and technique kill chains identify cyber adversary objectives of security incidents that occurred over a timeline. A kill chain provides identification and prevention of cyber intrusions. In other words, the kill chain identifies what the cyber adversary must do to achieve an objective and prevent it from occurring. Illustrative embodiments capture cyber adversary behavioral data, which includes objectives and techniques, via security rules and security events, which subject matter experts previously mapped to one or more cyber adversary objective categories, such as reconnaissance, denial of service attack, malware, exploit, and the like. An exploit is a piece of software, chunk of data, or sequence of commands that take advantage of a vulnerability in software or hardware to cause unintended or unanticipated behavior to occur on a computer. Such behavior may include, for example, taking control of the computer, allowing privilege escalation, or the like.

The subject matter experts map each security rule to one or more cyber adversary objectives using low-level category information and inference from the definition of the rule, itself. Pivoting around the security incident, illustrative embodiments collect related security events that occurred around the timeline of the security incident. Illustrative embodiments determine the cyber adversary objectives that apply to the related security events using the security rules that correspond to the security incident.

Illustrative embodiments utilize different types of security rules when associating the security rules with different cyber adversary objectives. For example, one type of security rule may be a rule that illustrative embodiments can map to a set of one or more cyber adversary objectives with a high-level of confidence. A second type of security rule may be a rule that checks for a subjective sequence of events corresponding to a security incident and requires dynamic selection from a list of possible cyber adversary objectives associated with the sequence of events. A third type of security rule may be a rule that corresponds to a combination of multiple cyber adversary objectives.

In order to deal with each different cyber adversary objective effectively, illustrative embodiments assign a weight to each cyber adversary objective associated with a security rule at the time of classification by the subject matter experts. For example, illustrative embodiments assign cyber adversary behavior "Defense Evasion", which is mapped to security rule "Excessive Firewall Denies from Host", with a weight of 100 and a mapping confidence level of high. Illustrative embodiments use the mapping confidence level to indicate the accuracy of the security rule to cyber adversary objective mapping. Illustrative embodiments utilize a security incident confidence level to indicate the accuracy of mapping the security incident to that particular security rule corresponding to the cyber adversary objective.

During cloud-based security analytics of the security incident, illustrative embodiments query the indicators of compromise noticed in the security incident for malicious relationships with other related indicators of compromise. If illustrative embodiments also notice the related indicators of compromise in the network flow data or security events, illustrative embodiments collect the threat intelligence data associated with the indicators from the structured threat intelligence data sources and other third-party threat intelligence data sources. For identification of the cyber adversary objectives and techniques corresponding to the security incident, illustrative embodiments must have noticed the related indicators of compromise in the local security incident context data. If illustrative embodiments identify a malware campaign as part of the attack, then illustrative embodiments query one or more unstructured threat intelligence data sources to identify vulnerabilities information and objectives, techniques, and procedures data, which illustrative embodiments further use for objective and technique classification. Based on the structured and unstructured threat intelligence data, illustrative embodiments identify the cyber adversary objectives and techniques used during the security incident and add this information to the security attack graph as a relation to the indicators of compromise. Moreover, illustrative embodiments execute a response to the security incident that may include a set of one or more mitigation action steps, such as, for example, send a security alert to security analysts for further analysis and possible action, terminate network communication between the source system IP address and the target system IP address corresponding to the security incident, flag the user of the source system as a malicious user, and the like.

Thus, illustrative embodiments provide one or more technical solutions that overcome a technical problem with identification of cyber adversary objectives and their related techniques corresponding to a security incident during an attack on a network and its resources. As a result, these one or more technical solutions provide a technical effect and practical application in the field of network security by identifying and preventing network attacks.

Figure 5:
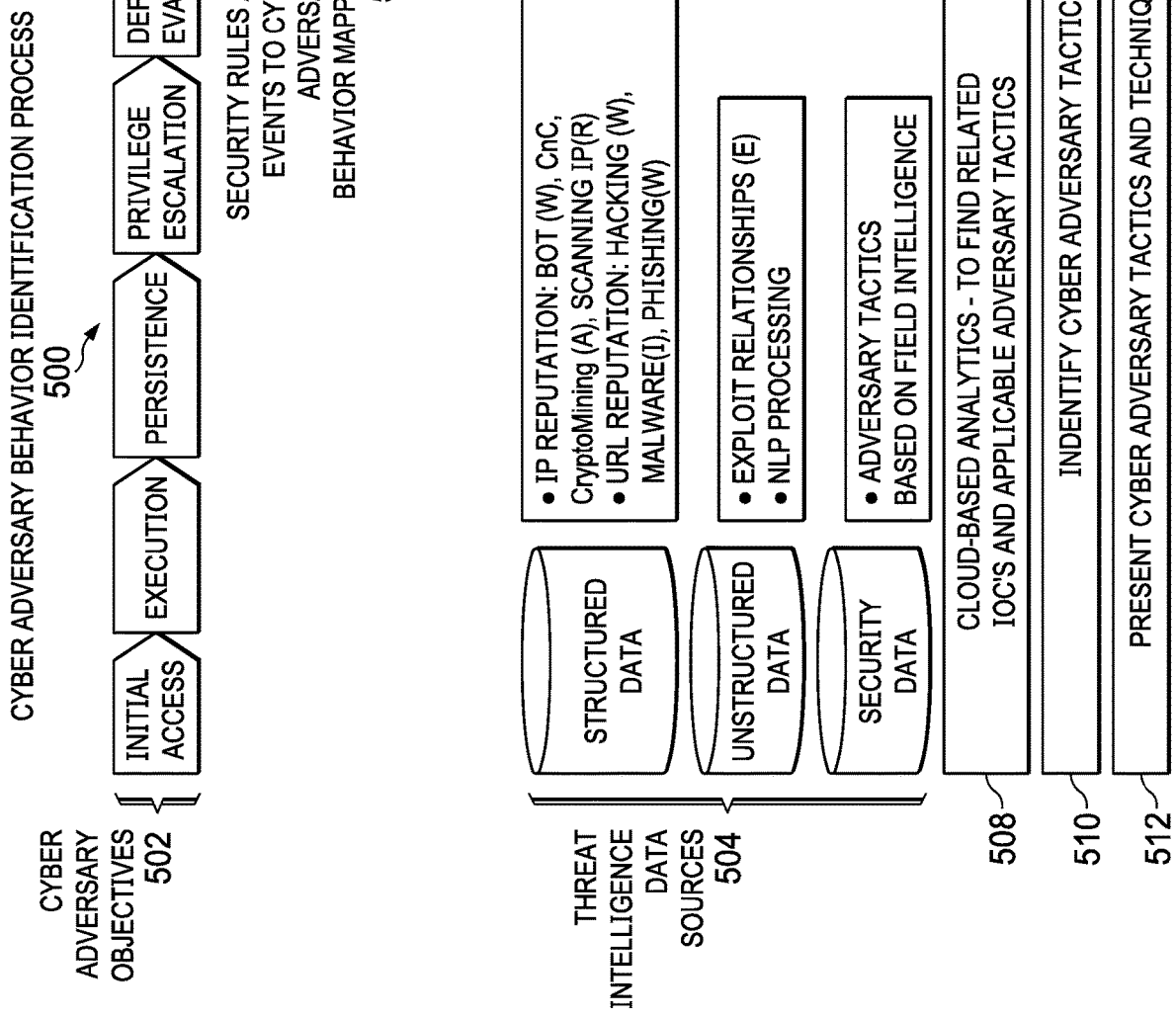
FIG. 5 is a diagram illustrating an example of a cyber adversary behavior identification process in accordance with an illustrative embodiment.

With reference now to FIG. 5, a diagram illustrating an example of a cyber adversary behavior identification process is depicted in accordance with an illustrative embodiment. Cyber adversary behavior identification process 500 may be implemented in a network of data processing systems, such as network data processing system 100 in FIG. 1, or a cloud computing environment, such as cloud computing environment 300 in FIG. 3. Cyber adversary behavior identification process 500 is a system of hardware and software components for identifying cyber adversary behavior corresponding to a security incident on a computer network, such as network 102 in FIG. 1, based on mapping security rules and indicators of compromise to cyber adversary objectives and their related techniques.

In this example, cyber adversary behavior identification process 500 includes cyber adversary objectives 502, threat intelligence data sources 504, and security rules and events to cyber adversary behavior mapping 506. Cyber adversary objectives 502 may be, for example, cyber adversary objectives 238 in FIG. 2. In this example, cyber adversary objectives 502 include initial access, execution, persistence, privilege escalation, defense evasion, lateral movement, command and control, and exfiltration. However, it should be noted that cyber adversary objectives 502 may include more or fewer objectives than illustrated.

Threat intelligence data sources 504 represents a plurality of remote trusted third-party indicators of compromise-based threat intelligence data sources. In this example, threat intelligence data sources 504 include a structured data source, an unstructured data source, and a security data source. However, it should be noted that threat intelligence data sources 504 may include any number and type of threat intelligence data sources. The structured data source may be, for example, one or more relational databases that contain indicators of compromise-based threat intelligence information such as IP address reputations, URL address reputations, malware information, phishing information, malicious bot information, hacking information, and the like. The unstructured data source may be, for example, one or more web logs, chat rooms, social media web sites, or other types of unstructured data sources that contain exploit information, vulnerabilities, exploit relationships, and the like. Cyber adversary behavior identification process 500 may utilize artificial intelligence natural language processing to extract the unstructured threat intelligence information. The security data source may be, for example, one or more sources of cyber adversary tactics information that identify a particular defined cyber adversary objective corresponding to a particular cyber adversary behavior based on field intelligence.

Security rules and events to cyber adversary behavior mapping 506 may be, for example, security rules and events to cyber adversary behavior mapping 220 in FIG. 2. Cyber adversary behavior identification process 500 utilizes security rules and events to cyber adversary behavior mapping 506 to map each respective security rule and corresponding rule building blocks to one or more cyber adversary behaviors and objectives. In addition, cyber adversary behavior identification process 500 utilizes user behavior analytics and security rules and events to cyber adversary behavior mapping 506 to map each respective security event to one or more cyber adversary behaviors and objectives.

At 508, cyber adversary behavior identification process 500 utilizes cloud-based analytics to find related indicators of compromise corresponding to cyber adversary objectives 502 and applicable cyber adversary tactics. At 510, cyber adversary behavior identification process 500 identifies defined cyber adversary objectives and techniques based on cyber adversary objectives 502, threat intelligence data sources 504, security rules and events to cyber adversary behavior mapping 506, and the cloud-based analytics identifying the related indicators of compromise. Further, cyber adversary behavior identification process 500 presents details regarding the cyber adversary objectives and techniques in a security attack graph, such as security attack graph 240 in FIG. 2.

With reference now to FIG. 6, a diagram illustrating an example of a malware campaign to cyber adversary objective mapping process is depicted in accordance with an illustrative embodiment. Malware campaign to cyber adversary objective mapping process 600 may be implemented in a security information and events manager, such as, for example, security information and events manager 218 in FIG. 2. Malware campaign to cyber adversary objective mapping process 600 includes cyber adversary objectives 602, such as, for example, cyber adversary objectives 502 in FIG. 5.

In this example, the security information and events manager maps cyber adversary objectives and techniques of a malware campaign, such as, for example, a Cozy Duke malware campaign, to different objectives in cyber adversary objectives 602 based on security incidents and triggered security rules corresponding to a target registered client data processing system, such as, for example, client data processing system 224 in FIG. 2. For example, the security information and events manager maps security event "INFORMATIONAL EMAIL MESSAGE" 604 to the initial access objective in cyber adversary objectives 602. Similarly, the security information and events manager maps security event "WEB ATTACK: SUSPICIOUS EXECUTABLE FILE DOWNLOAD" 606 to the execution objective and security rule "UBA: SHELLBAGS MODIFIED BY RANSOMWARE" 608 to the persistence objective in cyber adversary objectives 602. In addition, the security information and events manager maps security rule "TCP_HIT" 610, security rule "UBA: RISKY URL FILTER CATEGORY-MALICIOUS SOURCES" 612, and security rule "SUSPICIOUS OUTBOUND WEB/PROXY TRAFFIC" 614 to the command and control objective in cyber adversary objectives 602.

It should be noted that 604-614 represent separate security incidents that the target client data processing system reported to the security information and events manager. The security information and events manager utilizes machine learning to relate the security incidents and identify the cyber adversary objectives and techniques typical of a Cozy Duke malware campaign.

Figure 7:
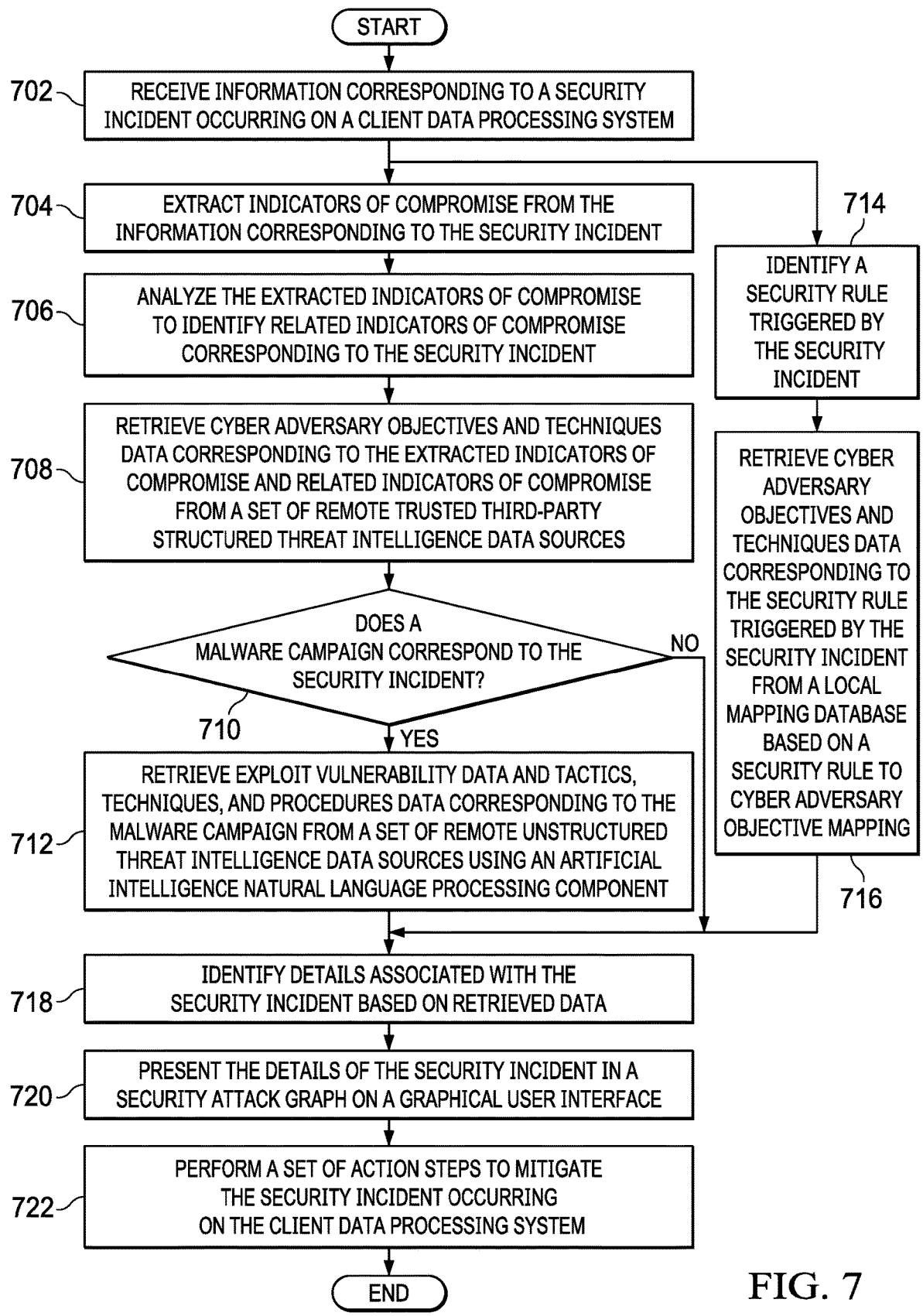
FIG. 7 is a flowchart illustrating a process for identifying cyber adversary objectives and techniques corresponding to a security incident on a computer network in accordance with an illustrative embodiment.

With reference now to FIG. 7, a flowchart illustrating a process for identifying cyber adversary objectives and techniques corresponding to a security incident on a computer network is shown in accordance with an illustrative embodiment. The process shown in FIG. 7 may be implemented in a computer, such as, for example, server 104 in FIG. 1, data processing system 200 in FIG. 2, or a cloud computing node in cloud computing nodes 310 of cloud computing environment 300 in FIG. 3.

The process begins when the computer receives information corresponding to a security incident occurring on a client data processing system (step 702). The computer extracts indicators of compromise from the information corresponding to the security incident (step 704). In addition, the computer analyzes the extracted indicators of compromise to identify related indicators of compromise corresponding to the security incident (step 706).

The computer retrieves cyber adversary objectives and techniques data corresponding to the extracted indicators of compromise and related indicators of compromise from a set of one or more remote trusted third-party structured threat intelligence data sources (step 708). Further, the computer makes a determination as to whether a malware campaign corresponds to the security incident (step 710). If the computer determines that a malware campaign does not correspond to the security incident, no output of step 710, then the process proceeds to step 718. If the computer determines that a malware campaign does correspond to the security incident, yes output of step 710, then the computer retrieves exploit vulnerability data and tactics, techniques, and procedures data corresponding to the malware campaign from a set of remote unstructured threat intelligence data sources using an artificial intelligence natural language processing component (step 712). Thereafter, the process proceeds to step 718.

It should be noted that the computer may perform steps 704-712 in parallel with steps 714 and 716. In an alternative illustrative embodiment, the computer may perform steps 714 and 716 after step 712. In yet another alternative illustrative embodiment, the computer may perform steps 714 and 716 before step 712.

The computer identifies a security rule triggered by the security incident (step 714). Further, the computer retrieves cyber adversary objectives and techniques data corresponding to the security rule triggered by the security incident from a local mapping database based on a security rule to cyber adversary objective mapping (step 716). Furthermore, the computer identifies details associated with the security incident based on retrieved data (step 718).

The computer presents the details of the security incident in a security attack graph on a graphical user interface (step 720). Moreover, the computer performs a set of one or more action steps to mitigate the security incident occurring on the client data processing system (step 722). Thereafter, the process terminates.

Figure 8:
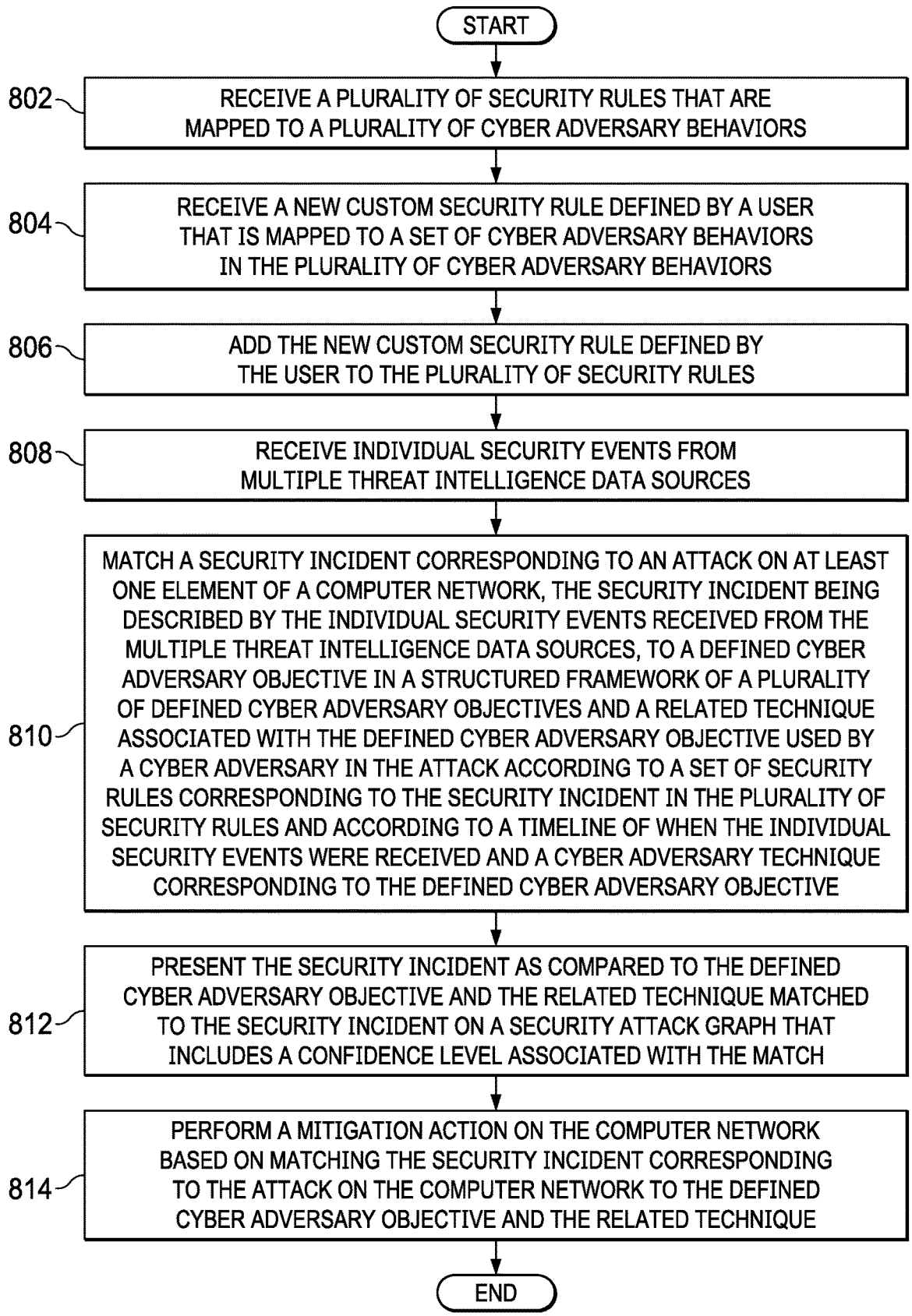
FIG. 8 is a flowchart illustrating a process for presenting security incident information on a security attack graph in accordance with an illustrative embodiment.

With reference now to FIG. 8, a flowchart illustrating a process for presenting security incident information on a security attack graph is shown in accordance with an illustrative embodiment. The process shown in FIG. 8 may be implemented in a computer, such as, for example, server 104 in FIG. 1, data processing system 200 in FIG. 2, or a cloud computing node in cloud computing nodes 310 of cloud computing environment 300 in FIG. 3.

The process begins when the computer receives a plurality of security rules that are mapped to a plurality of cyber adversary behaviors (step 802). In addition, the computer receives a new custom security rule defined by a user that is mapped to a set of one or more cyber adversary behaviors in the plurality of cyber adversary behaviors (step 804). The computer adds the new custom security rule defined by the user to the plurality of security rules (step 806).

The computer receives individual security events from multiple threat intelligence data sources (step 808). The computer matches a security incident corresponding to an attack on at one element of a computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack according to a set of one or more security rules corresponding to the security incident in the plurality of security rules and according to a timeline of when the individual security events were received and a cyber adversary technique corresponding to the defined cyber adversary objective (step 810). The computer presents the security incident as compared to the defined cyber adversary objective and the related technique matched to the security incident on a security attack graph that includes a confidence level associated with the match (step 812). Further, the computer performs a mitigation action on the computer network based on matching the security incident corresponding to the attack on the computer network to the defined cyber adversary objective and the related technique (step 814). Thereafter, the process terminates.

Thus, illustrative embodiments of the present invention provide a computer-implemented method, computer system, and computer program product for identifying cyber adversary behavior on a computer network corresponding to a security incident reported to a security information and event manager based on mapping security rules and events to known cyber adversary objectives and techniques. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying cyber adversary behavior on a computer network, the computer-implemented method comprising:
receiving individual security events from multiple threat intelligence data sources;
matching a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack;
performing a set of mitigation actions on the computer network based on the matching of the security incident corresponding to the attack on the computer network to the defined cyber adversary objective and the related technique; and
presenting the security incident as compared to the defined cyber adversary objective and the related technique matched to the security incident on a security attack graph.

2. The computer-implemented method of claim 1, wherein the matching is performed according to a set of security rules corresponding to the security incident in a plurality of security rules.

3. The computer-implemented method of claim 1, wherein the matching is performed according to a timeline of when the individual security events were received and a cyber adversary technique corresponding to the defined cyber adversary objective.

4. The computer-implemented method of claim 1, wherein the security attack graph includes a confidence level associated with the matching of the security incident corresponding to the attack on the computer network to the defined cyber adversary objective and the related technique used by the cyber adversary in the attack.

5. The computer-implemented method of claim 1 further comprising:
receiving a plurality of security rules that are mapped to a plurality of cyber adversary behaviors;
receiving a new custom security rule defined by a user that is mapped to a set of cyber adversary behaviors in the plurality of cyber adversary behaviors; and
adding the new custom security rule defined by the user to the plurality of security rules.

6. The computer-implemented method of claim 1 further comprising:

receiving information corresponding to the security incident occurring on a registered client data processing system;

extracting indicators of compromise from the information corresponding to the security incident;

analyzing the extracted indicators of compromise to identify related indicators of compromise corresponding to the security incident; and retrieving cyber adversary objectives and techniques data corresponding to the extracted indicators of compromise and related indicators of compromise from a set of remote trusted third-party structured threat intelligence data sources.

7. The computer-implemented method of claim 6 further comprising:

determining whether a malware campaign corresponds to the security incident; and responsive to determining that a malware campaign does correspond to the security incident, retrieving exploit vulnerability data and tactics, techniques, and procedures data corresponding to the malware campaign from a set of remote unstructured threat intelligence data sources.

8. The computer-implemented method of claim 7 further comprising:

identifying a security rule triggered by the security incident; and retrieving cyber adversary objectives and techniques data corresponding to the security rule triggered by the security incident from a local mapping database based on a security rule to cyber adversary objective mapping.

9. The computer-implemented method of claim 8 further comprising:

identifying details associated with the security incident based on retrieved data; and presenting the details of the security incident in a security attack graph on a graphical user interface.

10. A computer system for identifying cyber adversary behavior on a computer network, the computer system comprising:

a bus system;

a storage device connected to the bus system, wherein the storage device stores program instructions; and a processor connected to the bus system, wherein the processor executes the program instructions to:

receive individual security events from multiple threat intelligence data sources;

match a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack;

perform a set of mitigation actions on the computer network based on matching the security incident corresponding to the attack on the computer network to the defined cyber adversary objective and the related technique; and present the security incident as compared to the defined cyber adversary objective and the related technique matched to the security incident on a security attack graph.

11. The computer system of claim 10, wherein matching is performed according to a set of security rules corresponding to the security incident in a plurality of security rules.

12. The computer system of claim 10, wherein matching is performed according to a timeline of when the individual security events were received and a cyber adversary technique corresponding to the defined cyber adversary objective.

13. The computer system of claim 10, wherein the security attack graph includes a confidence level associated with the matching of the security incident corresponding to the attack on the computer network to the defined cyber adversary objective and the related technique used by the cyber adversary in the attack.

14. A computer program product for identifying cyber adversary behavior on a computer network, the computer program product comprising a computer readable storage medium having program instructions embodied therewith, the program instructions executable by a computer to cause the computer to perform a method comprising:

receiving individual security events from multiple threat intelligence data sources;

matching a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack;

performing a set of mitigation actions on the computer network based on the matching of the security incident corresponding to the attack on the computer network to the defined cyber adversary objective and the related technique; and presenting the security incident as compared to the defined cyber adversary objective and the related technique matched to the security incident on a security attack graph.

15. The computer program product of claim 14, wherein the matching is performed according to a set of security rules corresponding to the security incident in a plurality of security rules.

16. The computer program product of claim 14, wherein the matching is performed according to a timeline of when the individual security events were received and a cyber adversary technique corresponding to the defined cyber adversary objective.

17. The computer program product of claim 14, wherein the security attack graph includes a confidence level associated with the matching of the security incident corresponding to the attack on the computer network to the defined cyber adversary objective and the related technique used by the cyber adversary in the attack.

18. A computer-implemented method for identifying cyber adversary behavior on a computer network, the computer-implemented method comprising:

receiving individual security events from multiple threat intelligence data sources;

matching a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack to achieve the defined cyber adversary objective; and performing a set of mitigation actions on the computer network based on the matching of the security incident corresponding to the attack on the computer network to the defined cyber adversary objective and the related technique.

19. A computer system for identifying cyber adversary behavior on a computer network, the computer system comprising:
- a bus system;
- a storage device connected to the bus system, wherein the storage device stores program instructions; and
- a processor connected to the bus system, wherein the processor executes the program instructions to:
  - receive individual security events from multiple threat intelligence data sources;
  - match a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack to achieve the defined cyber adversary objective; and
  - perform a set of mitigation actions on the computer network based on matching the security incident corresponding to the attack on the computer network to the defined cyber adversary objective and the related technique.

20. A computer program product for identifying cyber adversary behavior on a computer network, the computer program product comprising a computer readable storage medium having program instructions embodied therewith, the program instructions executable by a computer to cause the computer to perform a method comprising:
- receiving individual security events from multiple threat intelligence data sources;
- matching a security incident corresponding to an attack on at least one element of the computer network, the security incident being described by the individual security events received from the multiple threat intelligence data sources, to a defined cyber adversary objective in a structured framework of a plurality of defined cyber adversary objectives and a related technique associated with the defined cyber adversary objective used by a cyber adversary in the attack to achieve the defined cyber adversary objective; and
- performing a set of mitigation actions on the computer network based on the matching of the security incident corresponding to the attack on the computer network to the defined cyber adversary objective and the related technique.

\* \* \* \* \*